United States Patent [19]

Kirkham

[11] Patent Number: 4,604,963

[45] Date of Patent: Aug. 12, 1986

[54] DIGITAL GRAPHIC IMAGE ANALYZER

[76] Inventor: James A. Kirkham, 2817 Xerxes Ave. S., Minneapolis, Minn. 55416

[21] Appl. No.: 676,832

[22] Filed: Nov. 30, 1984

[51] Int. Cl.$^4$ .............................................. G01J 3/52
[52] U.S. Cl. .................................... 116/300; 358/107; 356/404; 356/421
[58] Field of Search ............... 116/284, 299, 300, 301, 116/306, 309, 316, 317, 321, 327, 335, 337, 223, DIG. 41, 280; 378/901, 204, 207, 210; 128/635, 636, 771, 738; 382/59, 6; 358/139, 107; 33/1 C; 434/104; 356/421–424, 404, 243

[56] References Cited

U.S. PATENT DOCUMENTS

| | | | |
|---|---|---|---|
| 2,240,053 | 4/1941 | Richardson | 356/423 |
| 2,322,044 | 6/1943 | McFarlane et al. | 356/404 |
| 2,664,879 | 1/1954 | Hardy | 128/636 |
| 2,941,312 | 6/1960 | Mattucci | 356/404 |
| 4,112,594 | 9/1978 | Impastato | 356/423 |

Primary Examiner—Charles Frankfort
Assistant Examiner—Patrick R. Scanlon
Attorney, Agent, or Firm—Burd, Bartz & Gutenkauf

[57] ABSTRACT

A hand held and hand operated apparatus for analysis of the relationship between numerical values and displayed greyscale of pixels making up an image matrix. The apparatus has a pair of relatively movable members that are located relative to each other to display a greyscale in comparison relationship to window and level scales used to provide rapid analysis of a greyscale distribution of a given image. The members comprise a first cylindrical member concentrically accommodating a cylindrical sleeve. The first member has viewing ports ruled with scales representing values of selected window and level. The sleeve has the greyscale which can be selectively longitudinally and rotatably positioned relative to a viewing port to provide analysis information concerning the greyscale distribution of an image, such as the image on an X-ray film or displayed on a CRT.

25 Claims, 7 Drawing Figures

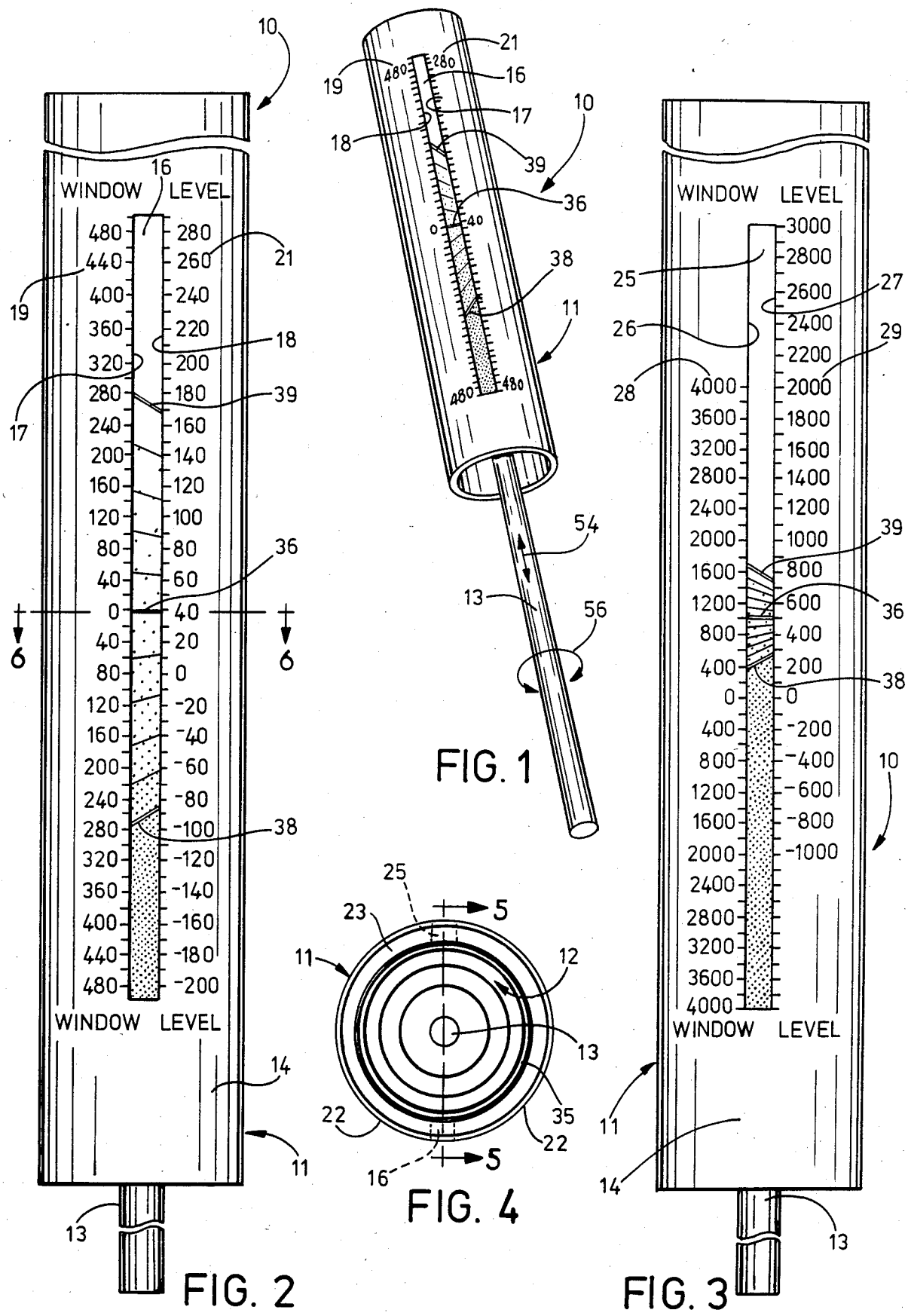

DIGITAL GRAPHIC IMAGE ANALYZER

FIELD OF INVENTION

The invention is in the field of devices and instruments used to analyze graphic images. The devices cordinate graphic images with information scales, such as scales having numerical values, to provide data used to analyze graphic images. More particularly, the invention is directed to a hand operated apparatus used for analysis of greyscale distribution of a graphic image such as an image on an X-ray film or an image displayed on a cathode ray tube (CRT).

BACKGROUND OF INVENTION

Digital images are used in diagnostic radiology. The digital images are derived numerically. A standard analog signal is converted to digital values for computer purposes. After the computer has performed its function, the results are re-converted into an analog image for analysis. The analog image is displayed on a CRT or video monitor. The image is black and white with intermediate shades of grey. It is known that the human eye can only distinquish approximately twenty shades from white to black with intermediate greys.

The image on the monitor is made up of pixels. Each pixel is electronically assigned in brightness range from black to white. The combination of the pixels makes the analog image. Radiologists are trained to interpret an analog image using a greyscale. The color contrasts of an analog image displayed on a monitor are somewhat confusing. A natural progression is perceived by the eye from blackgrey-white. The human perception of about twenty grey levels is utilized to build the analog image. Individual numbers are assigned to a pixel making up the image projected on the monitor. Each pixel is assigned a level of grey depending on the numerical value that the pixel represents. Pixels are arranged in a matrix.

The numerical values in the digitized information is substantially greater than the number of grey levels that can be perceived with the human eye. The distribution of the greyscale relative to the digital values can be assigned to maximize the limit of the human perceived greyscale. This is accomplished by using window and level values. The entire range of digitized information is displayed by dividing the range of information into twenty shades of grey. Each shade of grey is assigned to a subgroup of twenty subgroups of digitized numerical values. Using the values from a modern computer tomography (CT) unit, as an example, the digitized values from −1,000 to +3,000 are available. The total range is 4,000 CT numbers. Hence, 200 digitized numbers would be assigned to each shade of grey. Black would be used for values −1,000 to −800. The next blackest grey shade would be used for those pixels with a numerical value from −800 to −600. This arrangement is repeated until a white would be used for pixels ranging from +2800 to +3,000. The differences of digitized values would not be seen in the analog image unless the pixel values change by 200 numbers thereby causing a change in the grey. Different and smaller increments in the change of digital values can be displayed on a modified greyscale.

The middle shade of the greyscale is called the level or center. The middle greyscale shade can be assigned to any digitized value. The range of digitized value that the greyscale spans is called the window. The greyscale is distributed symmetrically. Ten shades of grey are on each side of the level and each of the shades represents an equal range of digitized values.

The greyscale need not be spread out to cover all digitized values. Greyscale displayed could be distributed over a very limited portion of the digitized information. As an example, with digital values from −1,000 to +3,000, the interest in a narrow range of pixel values such as −110 to +190 one could assign the middle shade of grey to +40 and spread the twenty shades over a range of only 300 numbers. In this example, the range of digital values, 300 over which the greyscale is distributed is called the window. The level is +40. Ten shades of grey lie above +40 and ten shades of grey lie below +40. If the digital pixel value lies above the window, outside of the assignment of the greyscale, the pixel will be white. If the digital pixel values lies below the window, the pixel will be black.

Each of the twenty grey shades will represent 15 digitized computed tomography numbers (CT numbers) using the above windows. Only a change of 16 numbers, at most, is required before a change in the pixel greyness is detected. With this window, smaller changes in CT number will be detected than in a window, smaller changes in CT number will be detected than in a window of 4,000 where a change of 200 is needed before noting a change in greyness of a pixel.

If the interest is narrowed to only a very small subsegment of a digital information, for example, 80 numbers, the window would be 80. If those numbers range from 0 to +80, as in a head computed tomography scan, then the window would be assigned at +40. Therefore, the greyscale would be centered at +40 and would cover a numerical CT number values from 0 to +80. CT number values below zero would be black and CT number values above +80 white.

SUMMARY OF INVENTION

The invention is directed to an apparatus which is used in the analysis of the relationship between numerical values and a displayed greyscale of pixels making up an image matrix. The apparatus allows rapid analysis of greyscale distribution of an image, such as an image on an X-ray film, or an image displayed on a cathode ray tube (CRT). An apparatus is used as a greyscale analyzer in digital radiography. The apparatus is described and used in computing tomography. However, it can be used in any digital image mode including ultrasound, nuclear medicine, digital radiography, and digital angiography. Broadly, the apparatus is used in analysis of an image having a plurality of shades of a color spectrum, such as varying shades of grey from black to white. The color spectrum can be varying shades of other colors or groups of colors. The utilization of the apparatus provides information of selected portions of the plurality of varying shades of color to provide readable indicia information for analysis of the color distribution of an image. The apparatus has a first means that includes an edge and a scale of readable indicia extended along the edge. A second means located adjacent the first means supports a reference color scale of varying shades of a color spectrum. A portion of the color scale is visible adjacent the edge so that the color scale can be compared with the scale of readable indicia. The first and second means are movable relative to each other so that the portion of the color scale visible adjacent the edge can be re-positioned relative to the scale of readable indicia whereby the technician can ascertain readable indicia information utilizable for analysis of the image.

The apparatus is a hand held and hand operated mechanical device that allows rapid analysis of window and level assignment of greyscale distribution relative to a given graphic image. The apparatus has two members that are moved relative to each other. One member has the window and level scales. The other member has a divergent greyscale. The members are moved relative to each other to allow the operator to observe a selected portion of the greyscale at a selected window and level setting.

In a preferred embodiment of the apparatus, the first member is a tubular member or cylinder having an inner passage, an outer surface with laterally spaced edges providing a longitudinal port. Window and level scales are located adjacent opposite sides of the port. A second member comprising a cylindrical sleeve is located within the passage of the first member. A divergent reference greyscale is mounted on the outside of the sleeve so it can be viewed through the port in the first member. The greyscale diverges in one direction from an apex point. The apex point is located on a linear reference line. The reference greyscale has a plurality of shades of grey commencing from the apex point in opposite directions from the refence line. The sleeve can be longitudinally moved and rotated relative to the first tubular member to change the position of the greyscale relative to the window and level scales to provide for an appropriate analysis of the greyshade distribution of the pixels making up the image matrix on a CRT or the image on an X-ray film for a given window and level setting. The cylinder can be provided with second laterally spaced edges forming a second longitudinal port. Window and level scales are located adjacent opposite sides of the second port. These scales have different scale ranges than the window and level scales located adjacent opposite sides of the first port. The differences in scale are used to display either larger of smaller increments of change in digital values in the analysis of the image. Additional ports could be added.

DESCRIPTION OF DRAWING

FIG. 1 is a perspective view of the graphic image analyzer of the invention;

FIG. 2 is an enlarged foreshortened front view of the analyzer of FIG. 1;

FIG. 3 is an enlarged foreshortened rear elevational view of the analyzer of FIG. 1;

FIG. 4 is an enlarged top view of FIG. 1;

DETAILED DESCRIPTION OF INVENTION

Figure 6:
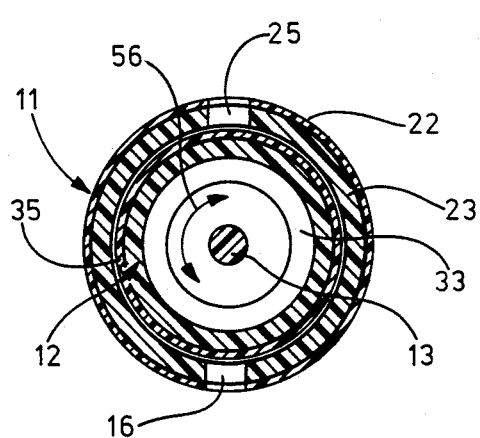
FIG. 6 is a sectional view taken along the line 6—6 of FIG. 2.

Referring to the FIGS. 1 to 4 of the drawing, there is shown the graphic image analyzer the invention indicated generally at 10 used to analyze the relationship between the numerical values and the displayed greyscale of pixels making up an image matrix on an X-ray film or image matrix displayed on a cathode ray tube (CRT). Analyzer 10 has a first member indicated generally at 11 cooperating with a second member indicated generally at 12. Members 11 and 12 are movable relative to each other to coordinate the relationship between a greyscale and window and level scales. First member 11 is an elongated linear tubular member or cylinder having an outer cylindrical surface 14. First member 11 has a first elongated linear slot or port 16 providing an opening for viewing the greyscale on second member 12. Member 11 has laterally spaced linear sides 17 and 18 forming the opposite sides of slot 16. A first "window" scale 19 is located adjacent and along linear side 17. Scale 19 is divided or ruled from 0 to 480 in 40 unit increments plus (+) and minus (−). A second scale 21 is located adjacent and along side 18. Second scale is a "level" scale divided into increments from 0 to +280 to 0 to −200. The scales 19 and 21 are embodied in a sheet member or film 22 secured to the outside of the first cylindrical member 11. Sheet member 22 can be coated with a transparent film to protect the ruled scales thereon.

Figure 5:
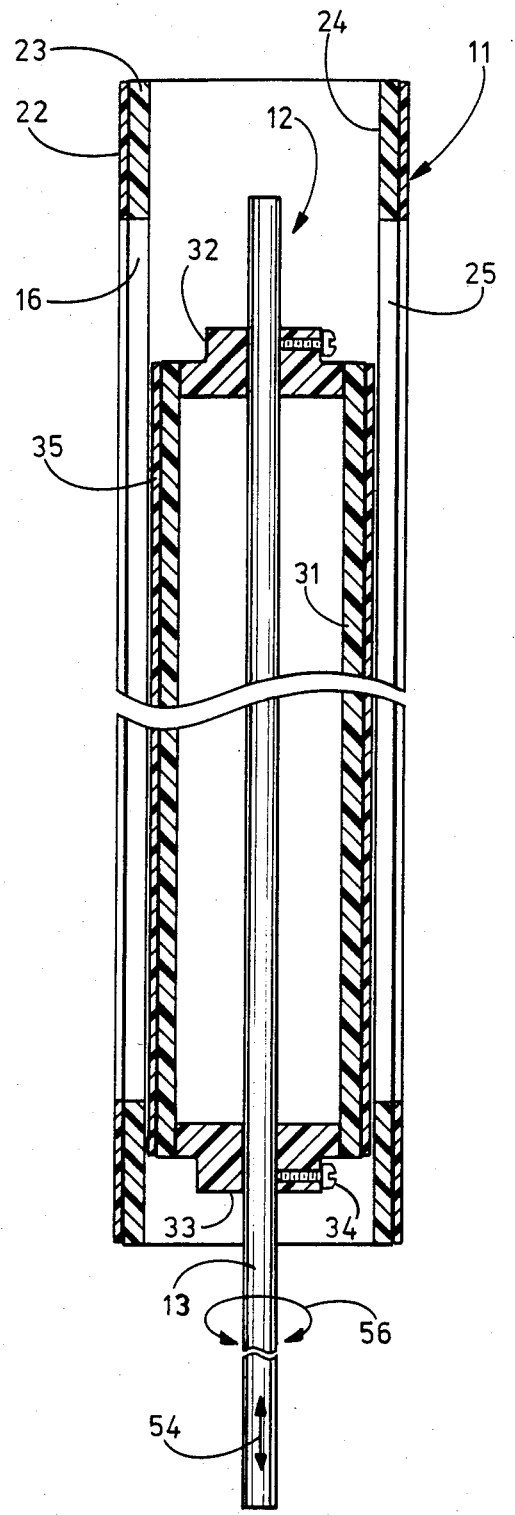
FIG. 5 is an enlarged sectional view taken along the lines 5—5 of FIG. 4.

As shown in FIGS. 4 and 5, sheet material 22 is secured with an adhesive or bonding material to an elongated linear cylindrical body 23 having an inner cylindrical surface 24. the first member 11 has a second longitudinal slot or port 25 located diametrically opposite first port 16. Body 23 has circumferentially or laterally spaced linear sides 26 and 27 forming port 25. A third "window" scale 28 is located adjacent and along side 26. Scale 28 is divided between +4,000 to −4,000 in increments of 400. A fourth "level" scale 29 is located adjacent and along linear edge 27. Scale 29 is divided between +3,000 and −1,000 in 200 unit intervals.

As shown in FIGS. 5 and 6, second cylindrical member 12 comprises an elongated cylindrical sleeve 31 attached at its opposite ends to end members 32 and 33. Set screws 34 in end members 32 and 33 secure an elongated control rod 13 to second member 12. Other means can be used to attach end members 32 and 33 to control rod 13. Sleeve 31 has a continuous outer cylindrical surface supporting cylindrical sheet material or film 35. The sheet material 35 is attached by adhesives, bonding material and the like to the outer surface of sleeve 31. Sheet material 35 is located in close relationship relative to the inner cylindrical surface 24 of body 23. This allows for relative movement between the first and second members 11 and 12. This relative movement includes linear movement and rotational movement of second member 12 to locate the greyscale carried by sheet member 35 in a selected position relative to viewing ports 60 or 25.

Figure 7:
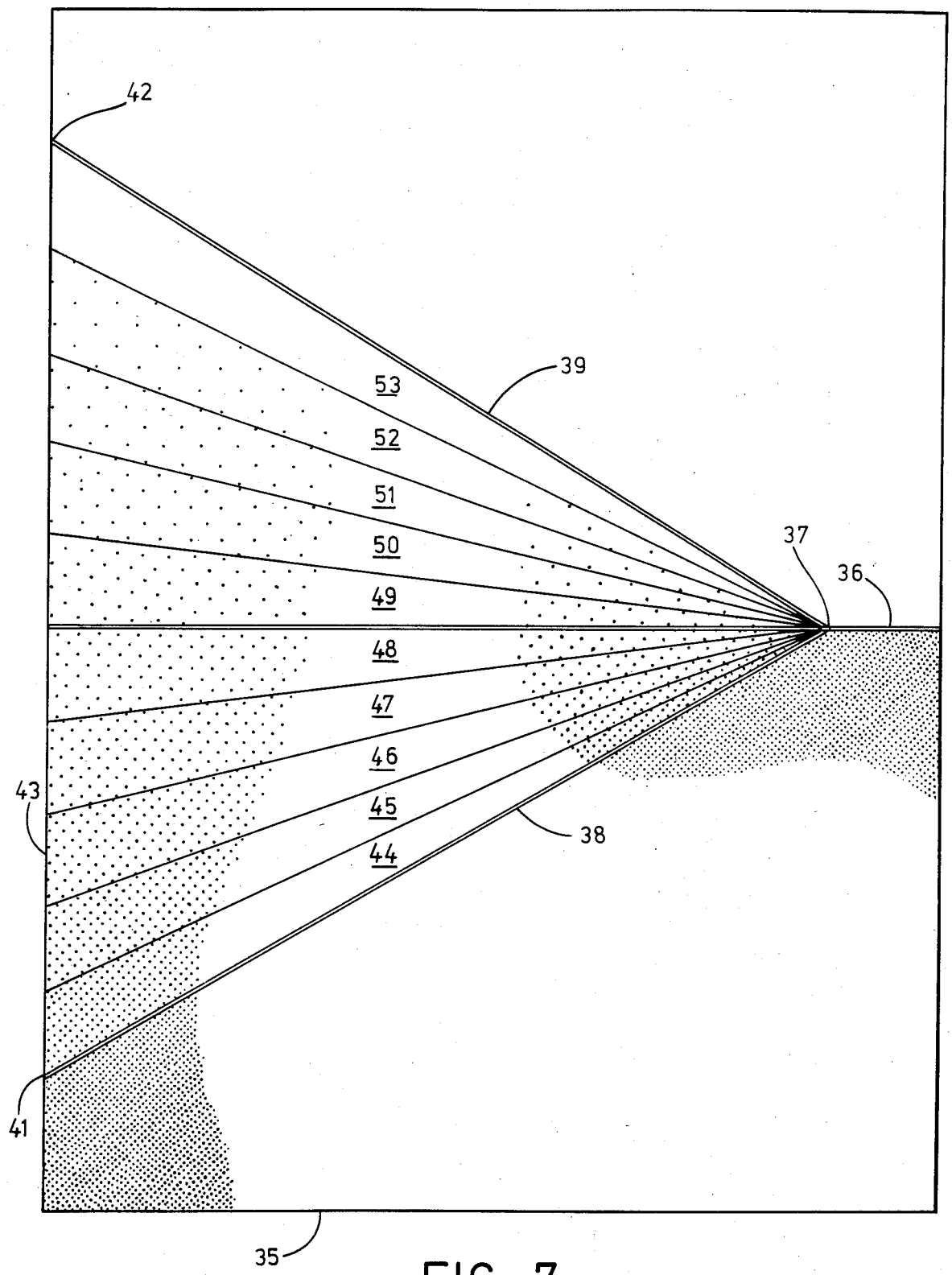
FIG. 7 is a diagrammatic plan view of the greyscale in linear form used in the analyzer of FIG. 1.

Referring to FIGS. 7, there is shown a linear representation of the greyscale on sheet material 35. The greyscale is horizontally divided with a reference line 36 containing apex point 37. The apex point 37 is the point of convergence of the diverging greyscale. Reference line 36 be a readily discernible colored line, such as a red line, that extends from apex point 37 to a vertical side line 43.

The greyscale includes perimeter or upper and lower limit lines 38 and 39 which diverge from apex point 37 above and below reference line 36. The angle between perimeter line 38 and reference line 36 is 30 degrees. The angle between reference line 36 and perimeter line 39 is 30 degrees. Other angles can be utilized. Perimeter line 38 and 39 extend to the side line 43 joined therewith at points 41 and 42 respectively. The area below the perimeter line 38 is black. The area between the perimeter line and reference line 36 is divided into five equal angular segments 44 to 48. Each angular segments has an angular arc of about 6 degrees. The angular segments 44 to 48 have varying shades of grey starting from a black grey segment 44 to an intermediate grey in segment 48.

The area above perimeter line 39 is white. The area between perimeter line 39 and the reference line 38 is divided into five equal angular segments 49 to 53. The segments 49 to 53 have varying shades of grey with a medium grey in segment 49 to a white grey in segment 53. Segments 49 to 53 each have an angular arc of about 6 degrees. The angular arcs of the segments 44 to 53 can be varied. Also, the number of angular segments making the diverging greyscale can be varied. The diverging greyscale can be constructed by photographic, artistic or computer generated techniques. It may be covered with a transparent film to protect it from abrasion on the inner surface 24 of body 23.

Inner member 12 is located in close clearance relation with respect to inner cylindrical wall 24 of first member 11. The entire inner member 12 is manually manipulated with the use of the hand control rod 13. The cylindrical member 12 can be rotated and/or linearly moved by holding with one hand the first cylindrical member 11 and moving the control rod 13 with the other hand. The greyscale can be selectively viewed through ports 16 and 25.

The greyscale analyzer 10 is usable for evaluation of the distribution of a greyscale on a photographic X-ray film and the image displayed on a CRT or video monitor. The window of the greyscale analyzer is changed by rotating the inner cylindrical member 12 with the use of the control rod 13. The level of the greyscale analyzer is changed by linearly moving the second member 12 relative to the first member 11. The user initially selects the window. The reference line 36 is initially placed on the zero of a desired window scale. The window width is adjusted by rotating inner cylindrical member 12 without vertically displacing member 12. The window width is read by notating the location of the perimeter line 38 and 39 of the greyscale relative to the window numbers.

The level is now selected. This is accomplished by linearly moving the inner member 12 relative to the outer member 11 without rotating the inner member. The position of the reference line 36 is moved to a selected level indicated by the level scale. For example, in FIG. 2, the level scale is +40 and the window is approximately 280. In FIG. 3, the level is at +500 and the window is 1400, that is between +300 and +1700. The immediate visual analysis of a grey distribution shade of any greyscale on the film or CT number is ascertainable. While there has been shown and described a hand manipulated apparatus for use in greyscale distribution of an image displayed on an X-ray film or a CRT, it is understood that changes in the structure and the numerical scales and the greyscale may be made by those skilled in the art without departing from the invention. The invention is defined in the following claims.

The embodiments of the invention in which an exclusive property or privilege is claimed are defined as follows:

1. An apparatus for use in analysis of an image having a plurality of varying shades of grey and providing information for selected portions of the plurality of varying shades of grey comprising: first means having an edge, a scale of readable indicia on the first means extended along said edge, second means located adjacent said first means, a reference greyscale of varying shades of grey from black to white on the second means, at least a portion of the greyscale being visible adjacent said edge whereby the greyscale can be compared with the scale of readable indicia, said reference greyscale having a reference line and said greyscale diverging from an apex point located on said reference line away from opposite sides of the reference line, said first and second means being movable relative to each other whereby the portion of the greyscale visible adjacent said edge is repositioned relative to the scale of readable indicia whereby said readable indicia provides information for analysis of said image having a plurality of shades of grey.

2. The apparatus of claim 1 wherein: the first means has an elongated opening providing a port for viewing a portion of the greyscale, said edge being located along said opening.

3. The apparatus of claim 1 wherein: said scale is a numerical scale that extends in opposite directions from a zero point.

4. An apparatus for use in analysis of an image having a plurality of varying shades of grey and providing information for selected portions of the plurality of varying shades of grey comprising: first means having an edge, a scale of readable indicia on the first means extended along said edge, second means located adjacent said first means, a reference greyscale of varying shades of grey from black to white on the second means, at least a portion of the greyscale being visible adjacent said edge whereby the greyscale can be compared with the scale of readable indicia, said first and second means being movable relative to each other whereby the portion of the greyscale visible adjacent said edge is repositioned relative to the scale of readable indicia, said first means having an elongated opening located between laterally spaced sides providing a port for viewing a portion of the greyscale, said edge being located adjacent one side of the opening, said scale of readable indicia on the first means extended along said one side of the opening, said first means having a second edge located adjacent the other side of the opening, a second scale of readable indicia on the first means extended along said other side of the opening, said greyscale having a portion that is referenced to one of the scales and a portion that is compared with the other scale of readable indicia whereby said readable indicia of each of said scales provides information for greyscale distribution analysis of said image having a plurality of varying shades of grey.

5. The apparatus of claim 4 wherein: the first scale is a first numerical scale having a range between plus 280 and minus 200, and the second scale is a second numerical scale having a range between plus 480 and minus 480.

6. The apparatus of claim 4 wherein: the first scale is first numerical scale having a range between plus 3,000 and minus 1,000, and the second scale is a second numerical scale having a range between plus 4,000 and negative 4,000.

7. An apparatus for use in analysis of an image having a plurality of varying shades of grey and providing information for selected portions of the plurality of varying shades of grey comprising: first means having an edge, a scale of readable indicia on the first means extended along said edge, second means located adjacent said first means, a reference greyscale of varying shades of grey from black to white on the second means, at least a portion of the greyscale being visible adjacent said edge whereby the greyscale can be compared with the scale of readable indicia, said first and second means being movable relative to each other whereby the portion of the greyscale visible adjacent said edge is repositioned relative to the scale of readable indicia, said first means has a first elongated opening located between laterally spaced sides providing a first port for viewing a portion of the greyscale, said scale comprising a first scale of readable indicia located adjacent one of said sides, a second scale of readable indicia on the first means located adjacent the other of said sides, said first means having a second elongated opening located between laterally spaced second sides providing a second port for viewing a second portion of the greyscale, said second opening being spaced from said first opening, a third scale of readable indicia on the first means extended along one side of the second opening, a fourth scale of readable indicia on the first means extended along the other side of the second opening, said greyscale having a portion that is selectively referenced to one of the first or second scales or referenced to one of the third or fourth scales and a portion that is compared with the other of the first or second scales or compared with the other of the third or fourth scales whereby said readable indicia of each of said scales provides information for greyscale distribution analysis of an image having a plurality of shades of grey.

8. The apparatus of claim 7 wherein: the first scale is a first numerical scale having a range of at least between plus 280 and minus 200, the second scale is a second numerical scale having a range between plus 480 and minus 480, the third scale is a third numerical scale having a range between plus 3,000 and minus 1,000, and the fourth scale is a fourth numerical scale having a range between plus 4,000 and negative 4,000.

9. An apparatus for use in analysis of an image having a plurality of varying shades of grey and providing information for selected portions of the plurality of varying shades of grey comprising: first means having an edge, a scale of readable indicia on the first means extended along said edge, second means located adjacent said first means, a reference greyscale of varying shades of grey from black to white on the second means, at least a portion of the greyscale being visible adjacent said edge whereby the greyscale can be compared with the scale of readable indicia, said first and second means being movable relative to each other whereby the portion of the greyscale visible adjacent said edge is repositioned relative to the scale of readable indicia, said first means is a cylindrical member having an inside cylindrical passage, an opening providing a port for viewing a portion of the greyscale, said edge being located along one side of the opening, said scale extended along said one side of the opening, said second means including a cylindrical sleeve located in said passage, said reference greyscale being located on said sleeve, said sleeve being rotatable and longitudinally movable relative to the cylindrical member to change the position of the greyscale relative to said scale whereby selected portions of the greyscale can be compared with the scale to provide information for analysis of greyscale distribution of an image having a plurality of shades of grey.

10. The apparatus of claim 9 wherein: the reference greyscale has a reference line, said greyscale diverging from an apex point located on the reference line away from opposite sides of the reference line.

11. The apparatus of claim 9 wherein: said scale is a numerical scale that extends in opposite directions from a zero point.

12. The apparatus of claim 9 wherein: said scale is a numerical scale having a range between plus 480 and minus 480.

13. The apparatus of claim 9 wherein: the scale is a numerical scale having a range between plus 4,000 and negative 4,000.

14. An apparatus for use in analysis of an image having a plurality of varing shades of grey and providing information for selected portions of the plurality of varying shades of grey comprising: first means having an edge, a scale of means of readable indicia on the first means extended along said edge, second means located adjacent said first means, a reference greyscale of varying shades of grey from black to white on the second means, at least a portion of the greyscale being visible adjacent said edge whereby the greyscale can be compared with the scale means of readable indicia, said first and second means being movable relative to each other whereby the portion of the greyscale visible adjacent said edge is repositioned relative to the scale means of readable indicia, said first means is a cylindrical member having an inside cylindrical passage, a first opening providing a first port for viewing a first portion of the greyscale, a second opening is circumferentially spaced from the first opening providing a second port for viewing a second portion of the greyscale, said scale means being located on the cylindrical member along opposite sides of the first opening and second opening providing readable indicia, said second means including a cylindrical sleeve located in said passage, said reference greyscale being located on said sleeve, said sleeve being rotatable and longitudinally movable relative to the cylindrical member to change the position of the greyscale relative to said scale means whereby selected portions of the greyscale can be compared with the scale means to provide information for analysis of greyscale distribution of an image having a plurality of shades of grey.

15. The apparatus of claim 14 wherein: said greyscale has a reference line, said greyscale diverging from an apex point located on said reference line away from opposite sides of the reference line.

16. The apparatus of claim 14 wherein: said scale means comprises a pluraltiy of numerical scales that extend in opposite directions from zero points.

17. The apparatus of claim 14 wherein: said scale means includes a first pair of scales located adjacent opposite sides of the first opening and a second pair of scales located adjacent the opposite sides of the second opening, said first and second scales having different unit distributions.

18. An apparatus for use in analysis of an image having a plurality of varying shades of color and providing information for selected portions of a colored image comprising: first means having an edge, a scale of readable indicia on the first means extended along said edge, second means located adjacent the first means, a reference color scale of varying shades of color on the second means, at least a portion of the color scale being visible adjacent said edge whereby the color scale can be compared with said scale of readable indicia, said reference color scale having a reference line, and said color scale diverging from an apex point located on said reference line away from opposite sides of the reference line, said first and second means being movable relative to each other whereby the portion of the color scale visible adjacent said edge can be repositioned relative to the readable indicia whereby said readable indicia provides information for analysis of the colored image.

19. The apparatus of claim 18 wherein: said scale of readable indicia is a numerical scale.

20. The apparatus of claim 18 wherein: the first means has an elongated opening providing a port for viewing a portion of the color scale.

21. An apparatus for use in analysis of an image having a plurality of varying shades of color and providing information for selected portions of a colored image comprising: first means having an edge, a scale of readable indicia on the first means extended along said edge, second means located adjacent the first means, a reference color scale of varying shades of color on the second means, at least a portion of the color scale being visible adjacent said edge whereby the color scale can be compared to said scale of readable indicia, said first and second means being movable relative to each other whereby the portion of the scale visible adjacent said edge can be repositioned relative to the readable indicia, said first means having a first elongated opening providing a first port for viewing a portion of the color scale, and a second elongated opening spaced from the first elongated opening providing a second port for viewing a second portion of the color scale whereby said readable indicia provides information for analysis of the colored image.

22. An apparatus for use in analysis of an image having a plurality of varying shades of color and providing information for selected portions of a colored image comprising: first means having an edge, a scale of readable indicia on the first means extended along said edge, second means located adjacent the first means, a reference color scale of varying shades of color on the second means, at least a portion of the color scale being visible adjacent said edge whereby the color scale can be compared to said scale of readable indicia, said first and second means being movable relative to each other whereby the portion of the scale visible adjacent said edge can be repositioned relative to the readable indicia, said first means is a cylindrical member having a cylindrical passage, said cylindrical member having at least one elongated opening providing a port for viewing a portion of the color scale, said second member being a sleeve located within said passage, said reference color scale being mounted on said sleeve, said sleeve being selectively rotatable and longitudinally movable to change the location of the color scale relative to the readable indicia whereby said readable indicia provides information for analysis of the colored image.

23. The apparatus of claim 22 wherein: the refernce color scale has a reference line, said color scale diverging from an apex point located on said reference line away from opposite sides of the reference line.

24. The apparatus of claim 22 wherein: said scale of readable indicia is a numerical scale.

25. The apparatus of claim 22 wherein: said cylindrical member has a second elongated opening providing a second port for viewing a second portion of the color scale.

* * * * *